US006642938B1

(12) United States Patent
Gilboy

(10) Patent No.: US 6,642,938 B1
(45) Date of Patent: Nov. 4, 2003

(54) REAL TIME PERSONAL CHANNEL

(75) Inventor: Christopher P Gilboy, Freehold, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/528,114

(22) Filed: Mar. 17, 2000

(51) Int. Cl.$^7$ ............................................... G09G 5/00
(52) U.S. Cl. ..................................... 345/721; 348/552
(58) Field of Search ......................... 345/721, 719–720, 345/722, 748–749, 744–747, 853–855, 717; 358/906–909; 348/21–24, 441, 173, 377–378, 702, 552, 563, 564; 725/56, 110, 34, 141, 37

(56) References Cited

U.S. PATENT DOCUMENTS

| 5,465,113 | A |   | 11/1995 | Gilboy |
| 5,621,456 | A | * | 4/1997  | Florin et al. .................... 348/7 |
| 5,635,978 | A |   | 6/1997  | Alten et al. |
| 5,673,089 | A |   | 9/1997  | Yuen et al. |
| 5,850,218 | A |   | 12/1998 | LaJoie et al. |
| 5,926,207 | A | * | 7/1999  | Vaughan et al. ............... 348/13 |
| 6,175,362 | B1 | * | 1/2001  | Harms et al. ................ 345/719 |
| 6,286,141 | B1 | * | 9/2001  | Browne et al. ................. 725/39 |
| 6,323,911 | B1 | * | 11/2001 | Schein et al. ................ 348/552 |
| 6,348,932 | B1 | * | 2/2002  | Nishikawa et al. ......... 345/719 |
| 6,351,270 | B1 | * | 2/2002  | Nishikawa et al. ......... 345/717 |
| 6,392,664 | B1 | * | 5/2002  | White et al. ................. 345/717 |
| 6,408,437 | B1 | * | 6/2002  | Hendricks et al. .......... 725/132 |
| 6,434,747 | B1 | * | 8/2002  | Khoo et al. .................... 725/46 |
| 6,449,767 | B1 | * | 9/2002  | Krapf et al. ................. 725/110 |
| 6,452,611 | B1 | * | 9/2002  | Gerba et al. ................. 345/721 |

* cited by examiner

Primary Examiner—Steven Sax

(57) ABSTRACT

A viewer can select one of a plurality of personal channels on a set-top box (10) and receive preferred programming on that channel irrespective of the true channel on which such programs are actually carried. The set-top box stores a look-up table (38) that identifies for each personal channel, the start time and true channel for each preferred program associated with a corresponding personal channel. Upon selection of the personal channel, the look-up table is scrutinized to determine which preferred program should be selected. Upon selection, the preferred program is displayed on the personal channel.

28 Claims, 4 Drawing Sheets

TIME OF DAY

PERSONAL CHANNEL NUMBER

| TIME | PERSONAL CHANNEL | | | | |
|---|---|---|---|---|---|
| | 100 | 101 | 102 | 103 | 104 |
| 12:00am–12:30am | 22 | 13 | 25 | | |
| 12:30am–1:00am | 22 | 22 | 2 | | |
| 1:00am–1:30am | 60 | 22 | 7 | | |
| 1:30am–2:00am | 29 | 31 | 7 | | |
| 2:00am–2:30am | 29 | 13 | 25 | | |
| ⋮ | | | | | |

TRUE CHANNEL NUMBER

*FIG. 4*

REAL TIME PERSONAL CHANNEL

TECHNICAL FIELD

This invention relates to a technique for providing a viewer with an individual channel for displaying preferred programming.

BACKGROUND ART

Many operators of cable television service, such as TCI, now AT&T Broadband and Internet Services, have begun upgrading their cable plants to offer digital cable service. The advent of digital cable television service affords subscribers many more channels in comparison to analog cable service. Having a larger number of channels means greater programming choices. However, the increased number of available program choices often requires viewers to sort through the programs to determine which ones they wish to view.

Various techniques currently exist for aiding the viewer in making programming selections. For example, most cable television providers offer a single channel displaying a listing of available program choices. However, the viewer must often wait as the screen scrolls through the entire list of program choices, often a time consuming process. Another approach is to allow viewers to designate a subset of favorite programs for display. Yet another approach allows a customer to program one or more theme channels, which, upon selection, provide the user with the ability to select a subset of programs corresponding to that particular theme.

Unfortunately, past attempts at overcoming the difficulty associated with finding desirable programming have not proven altogether successful. All require significant user interaction, and some require specialized equipment.

The problem associated with finding desirable programming is not limited necessarily to cable television viewers. Viewers of direct broadcast and satellite systems often face the daunting challenge of selecting among hundreds of available programs as well. Additionally, with the proliferation of sites on the World-Wide Web portion of the Internet offering streaming video and audio, individuals that browse the web often face programming selection choices too.

Thus, there is need for an approach that allows a subscriber to more easily find desirable programming.

BRIEF SUMMARY OF THE INVENTION

Briefly, the present invention provides a method for providing a viewer with at least one personal viewing channel that displays the viewer's preferred programming irrespective of the true channel on which such programs appear. Initially, the viewer's programming preferences are established. For example, the user may actually select a set of preferred programs. Alternatively, the viewer's past viewing history may be used to ascertain a preferred set of programs. Alternatively, the user may select a set of "keywords" or topics of interest that may be used to ascertain a preferred set of programs. After establishing the set of preferred programs, the true channel carrying each preferred program, along with the start time of that program are stored. At prescribed intervals, the stored information is scrutinized to identify which preferred program should appear on the personal channel based on the program's start time. The identified program is then displayed on the preferred channel.

BRIEF DESCRIPTION OF THE DRAWINGS

FIG. 4 depicts a table containing information stored in the set top box of FIGS. 1 and 2 associated with the viewer's personal channel(s).

DETAILED DESCRIPTION

Figure 1:
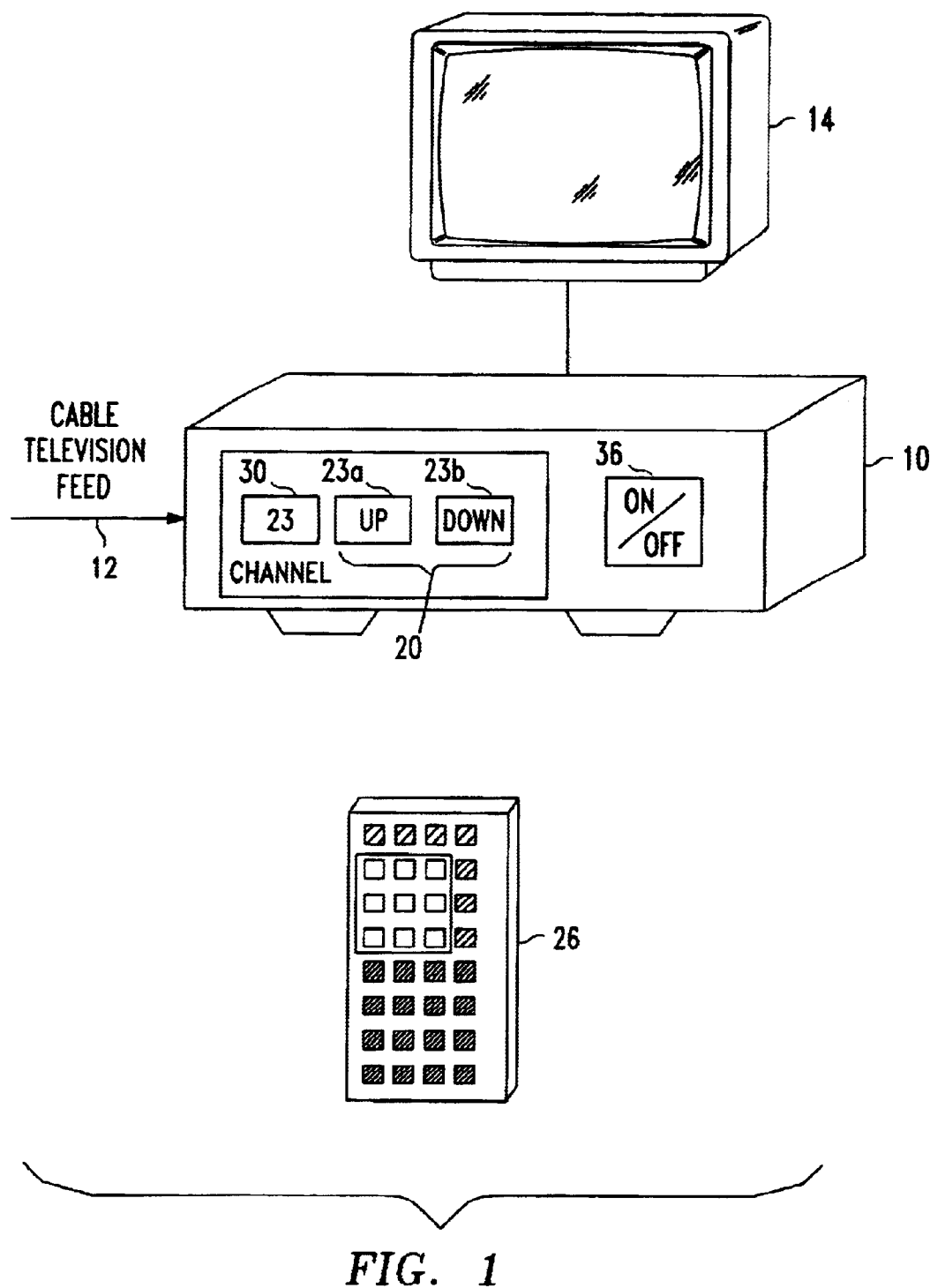
FIG. 1 illustrates a set-top box in accordance with a preferred embodiment of the invention.
Figure 2:
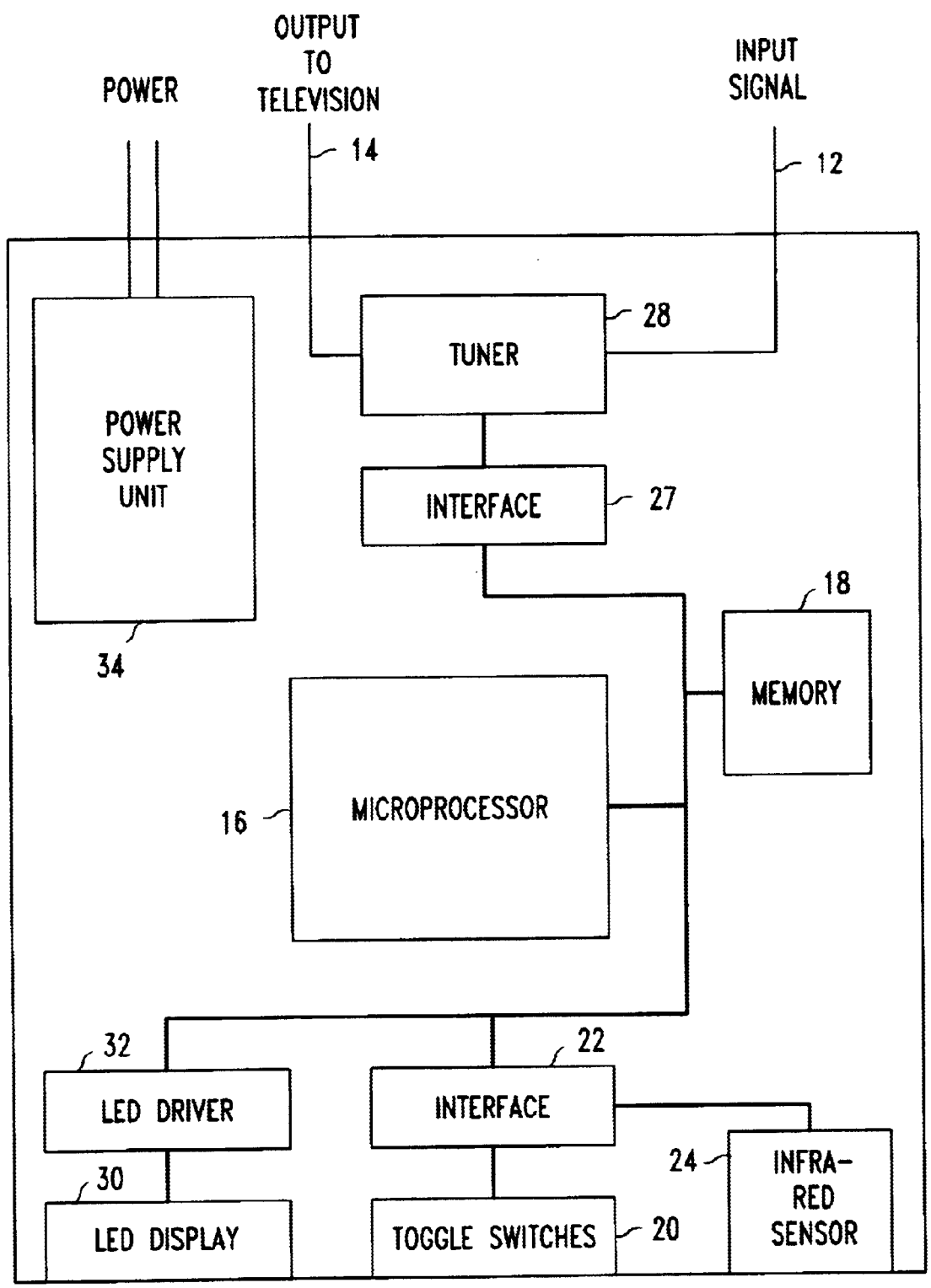
FIG. 2 illustrates a block schematic diagram of the set-top box of FIG. 1.

FIG. 1 illustrates a set top box 10 in accordance with a preferred embodiment of the invention for selecting program-carrying channels on a cable television feed 12 for display on a-television set 14. Instead of carrying cable television programming, the feed 12 could carry direct broadcast programs or satellite television programs. Referring to FIG. 2, at the heart of the step-top box 10 is a microprocessor 16 coupled to a memory 18. As discussed in detail below, the microprocessor 16 executes program instructions stored in the memory 18 to establish a set of viewer preferred programs and to cause those programs to be displayed at prescribed times on at least one preselected channel (hereinafter referred to as a "personal channel") on the television set 14 of FIG. 1 irrespective of the true channel on which each program appears.

The microprocessor 16 receives information from a set of toggle switches 20, coupled to the microprocessor through an interface 22. As seen in FIG. 1, the toggle switches 20 may include separate "up" and "down" switches 23a and 23b, respectively, which, when activated, signal the microprocessor 16 of FIG. 1 to select the next higher and next lower channel, respectively. In addition, the interface 22 couples the microprocessor to an infrared sensor 24 that responds to infrared pulses generated by a remote control 26 of FIG. 1 operated by a viewer. By actuating the remote control 26, a viewer can enter information to the set-top box 10. Thus for example, a viewer may select the channel of a favorite program, or may select the personal channel as discussed below.

Under control of the program in the memory 18, the microprocessor 16 responds to the input information received form the switches 20 and sensor 24. In response to such input signals, the microprocessor 16 provides output signals through an interface 27 to a tuner 28 coupled between the cable television feed 12 of FIG. 1 and the television set 14 of FIG. 1. In particular, the microprocessor 16 causes the tuner 28 to convert a particular channel on the feed 12 to particular channel for display on the television set 14 of FIG. 1.

For example, the tuner may convert an incoming program on channel 31 to channel 3 for display on the television set 14 of FIG. 1. As discussed in detail below, the tuner 28 has the capability of converting an incoming channel to one of several different outgoing personal channels depending on whether the incoming channel on the cable television feed 12 carriers a preferred program.

In addition to controlling the tuner 28, the microprocessor 16 also drives a Light Emitting Diode (LED) display 30 through an LED driver 34. In practice, the microprocessor 16 drives the LED display 30 to show the particular channel currently displayed on the television set 14. Depending on its configuration, the LED display 30 could display other information as well, such as the time or date.

The set top box 10 of FIG. 2 includes a power supply 34 for providing electrical energy to the various components within the set top box 10. In practice, an on-off switch 36 shown in FIG. 1 couples the power supply 34 to a source of AC power. Additionally, the microprocessor 16 may also control the power supply 34 in response to infrared signals received from the remote control 26 to turn the set-top box 10 off and on.

Figure 3:
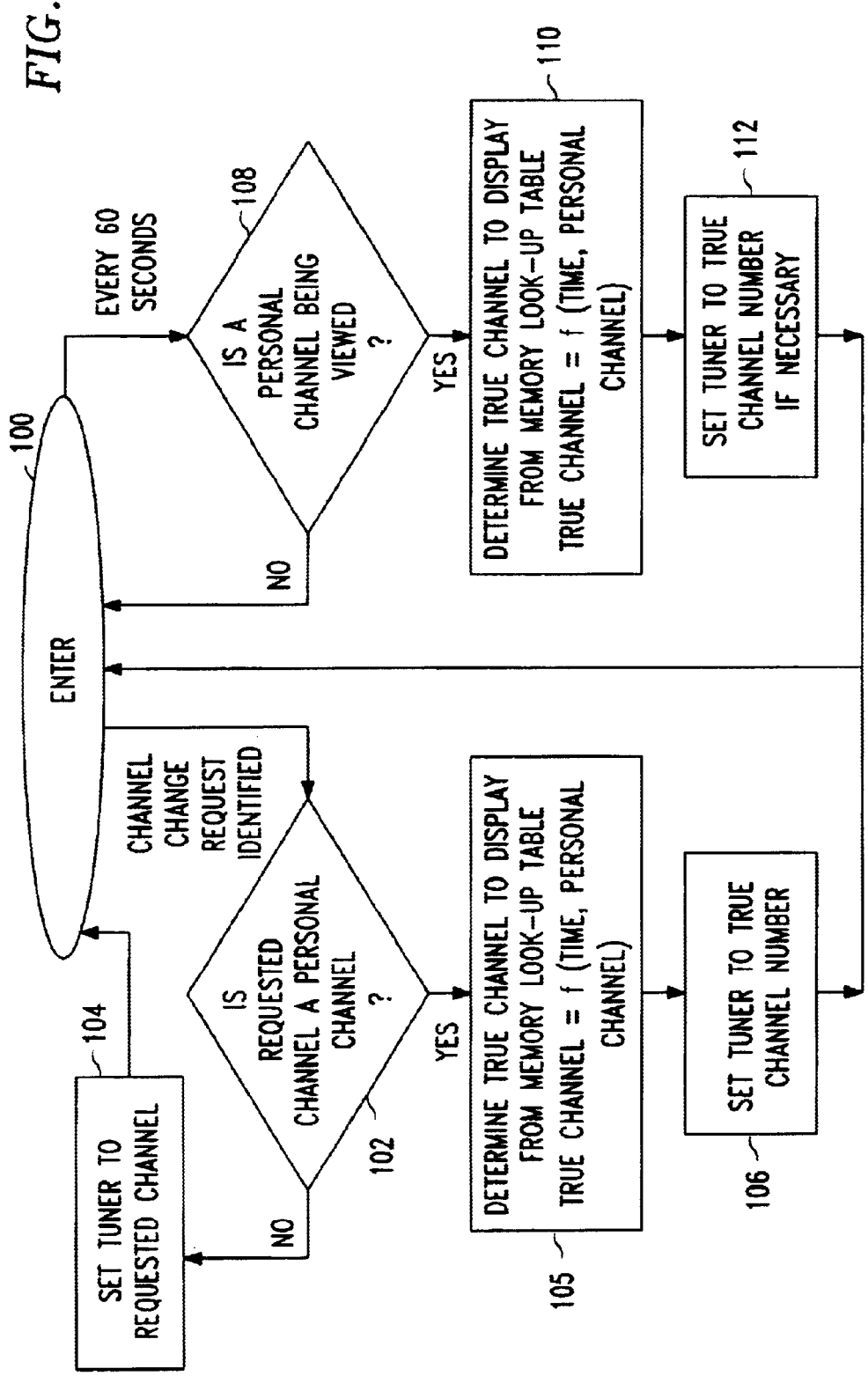
FIG. 3 illustrates, in flow chart form, the steps of a method executed by the set-top box of FIGS. 1 and 2 for providing a viewer with preferred programs on a personal channel.

FIG. 3 illustrates in flow chart form the steps of the method of the invention to display preferred programs on a personal channel on the television set 14 of FIG. 1 irrespective of the true channel on which such programs are actually broadcast. With the set-top box 10 of FIGS. 1 and 2 turned on, the microprocessor 16 of FIG. 2 continuously checks for inputs from either the toggle switches 20 (FIG. 2) or from the Infrared sensor 24 (FIG. 2) during step 100 of FIG. 3. Pursuant to a channel change, the microprocessor 16 of FIG. 2 determines during step 102 of FIG. 3 whether the viewer has selected a personal channel. As alluded to previously, the present invention allows a viewer to designate one or more personal channels selectable through the set top box 10 for displaying viewer preferred programming irrespective of the true channel on which such programs are actually broadcast.

If, during step 102, the microprocessor 16 of FIG. 2 determines that the requested channel is not a personal channel, then the microprocessor causes the tuner 28 of FIG. 2 to display the requested channel on the television set 14 of FIG. 2 on a prescribed channel, say channel 3 or 4 for example (step 104). However, if the viewer has selected a personal channel, then during step 105 of FIG. 3, the microprocessor 16 of FIG. 2 consults a look-up table 38 (See FIG. 4) to determine what true channel to display on the viewer's personal channel. As discussed below with respect to FIG. 4, the true channel for display depends both on the time of day, and the viewer's preferred programming. After determining the true channel for display during step 105 of FIG. 3, the microprocessor 16 of FIG. 2 sets the tuner 28 of FIG. 2 to convert the true channel of the program on the cable feed line 12 to the viewer-selected personal channel during step 106 of FIG. 3. Thereafter, the program execution branches back to step 100.

While awaiting for a channel change request, the microprocessor 16 of FIG. 2 periodically checks, typically every 60 seconds or so, whether the viewer is viewing a personal channel during step 108. If not, the microprocessor 16 simply waits the prescribed interval before re-executing step 108 of FIG. 3. If, during step 108, the viewer is viewing a personal channel, then the microprocessor 16 of FIG. 2 consults the look-up table 38 of FIG. 4 during step 110 of FIG. 3 to determine what true channel to display on the viewer's personal channel. The microprocessor 16 of FIG. 2 then sets the tuner 28 of FIG. 2 to convert the true channel for display on the viewer-selected personal channel during step 112 of FIG. 3. Thereafter, the program execution branches back to step 100. FIG. 4 graphically depicts the look-up table 38 stored in memory 16 of FIG. 2 for identifying the schedule of preferred programs for each personal channel, including the start time and ending times, and true channel number. For example, for personal channel 100, the viewer prefers the program on channel 22 during the interval between 12 Midnight and 12:30 AM and between 12:30 AM–1:00 AM while preferring channel 60 during the interval 1:00 AM–1:30 AM. By comparison, for personal channel 101, the viewer may prefer the program on channel 22 during the intervals 12 Midnight–12:30 AM, 12:30 AM–1:00 AM and 1:00 AM–1:30 AM. A viewer may have multiple personal channels while separate viewers may each have their own such channel(s).

A viewer may create the program listing for a personal channel by manually entering the time and true channel number for each personal channel. Alternatively, the viewer may operate the set-top box in a "learn" mode so that the microprocessor 16 of FIG. 2 will record the viewer's program selections over a prescribed interval, say a day, or a week, and thereby compile a list of preferred programs. Alternatively, a viewer may create a set of keywords or topics of interest that the set-top box can use to ascertain a preferred set of programs. Microprocessor 16 of FIG. 2 can match these aforementioned keywords or topics of interest against upcoming television programming using several methods such as an on-line television guide or programming information which may be digitally encoded in each channel's vertical blanking interval.

As may now be appreciated, by scrutinizing the look-up table 38 of FIG. 4, the microprocessor 16 of FIG. 2 can readily ascertain, at any given time, the viewer's viewing preferences when executing of steps 104 and 110 of FIG. 3. By comparing the current time to the start time of each preferred program, the microprocessor 16 can select the corresponding true channel of the program for display, and set the tuner 28 of FIG. 2 accordingly. Once the set of preferred programs is established, the viewer need only select his or her personal channel to receive the preferred programming. The microprocessor 16 will automatically determine which of the preferred programs to display, based on its start time, and then select that program, with no further action required by the viewer.

As thus described, the set top box 10 will display on one of a plurality of personal channels viewer preferred programming. Some television sets have the capability of providing a picture-in-picture display. Under such circumstances, the set top box 10 could advantageously output two preferred programs in a picture-in-picture display. To that end, the tuner 28 of FIG. 2 would respond to a command from the microprocessor 16 of FIG. 2 to output the desired preferred programs. Thus, the microprocessor 16 would have to scrutinize the look-up table 38 of FIG. 4 to select the programming to display the second most preferred program in addition to doing so to display the first most preferred program.

As alluded to earlier, individuals that browse the World-Wide web portion of the Internet now have the opportunity to select from hundreds of separate sites that offer streaming video or audio or combination thereof. The method of the invention can easily provide personal channels to display Internet programming on an Internet link in much the same manner as discussed for cable television, direct broadcast and satellite television. To practice the invention to accommodate streaming video, audio or combination thereof, the memory 18 would store the desired start time and Universal Resource Locator (URL) of the web site carrying the desired programming. Further, the tuner 28 of the set-top box 10 of FIG. 2 would need to operate in a different manner than with feed from a cable television, direct broadcast or satellite television source. To provide the viewer with such streaming video, audio or combination thereof on the viewer's personal channel, the tuner 28 would establish a link with the particular web site carrying the programming once the program start time coincides with the actual time. In this respect, the operation is similar to that described for television programming with the different program-carrying web sites corresponding to the different program carrying channels converted by the tuner 28 for display on the personal channel.

The foregoing describes a technique for providing a viewer with at least one personal viewing channel that displays the viewer's preferred programming irrespective of the true channel on which such programs appear.

The above-described embodiments merely illustrate the principles of the invention. Those skilled in the art may make various modifications and changes that will embody the principles of the invention and fall within the spirit and scope thereof.

What is claimed is:

1. A method of providing a viewer with a personal viewing channel that displays the viewer's preferred programs irrespective of the true channel on which the programs are carried, said viewer's preferred programs being compiled into a program listing prior to the viewer selecting the personal viewing channel, comprising the steps of:

storing information indicative of the true channel and start broadcast time of each viewer preferred program based on the compiled program listing;

scrutinizing the stored information to identify which preferred program should appear on said personal viewing channel in accordance with its start broadcast time; and displaying, on said personal viewing channel, said identified preferred program.

2. The method according to claim 1 wherein the program listing is established manually by the viewer through entry of the start broadcast time and true channel of each preferred program.

3. The method of claim 1 wherein the program listing is established by compiling the start broadcast time and true channel of programs viewed by the viewer over a prescribed time interval.

4. The method according to claim 3 wherein the prescribed interval is one day.

5. The method according to claim 3 wherein the prescribed interval is one week.

6. The method according to claim 1 wherein the program listing is established by identifying viewer preferred programs based on keywords or topics of interest provided by the viewer.

7. The method of claim 2 wherein a different program listing is established for each of a plurality of personal channels.

8. The method of claim 3 wherein a different program listing is established for each of a plurality of personal channels.

9. The method of claim 6 wherein a different program listing is established for each of a plurality of personal channels.

10. The method according to claim 1 wherein the step of scrutinizing the stored information is performed periodically.

11. The method according to claim 1 wherein the displaying step includes the step of converting the true channel of the preferred program to the personal channel.

12. The method according to claim 1 wherein the step of scrutinizing the stored information includes the step of comparing the start broadcast time of each preferred program to present time.

13. The method according to claim 1 wherein the preferred programming is carried on at least one of: a cable television feed, a direct broadcast feed, a satellite feed, and an Internet link.

14. The method according to claim 1 further including the steps of:

scrutinizing the stored information to identify which preferred program should appear on a second picture-in-picture display in accordance with its start time; and displaying, on said second picture-in-picture display, said identified preferred program.

15. A method of providing a viewer with a personal viewing channel that displays the viewer's preferred programs irrespective of the actual channel on which the programs are broadcast, comprising the steps of:

establishing a program listing of viewer preferred programs prior to the viewer selecting the personal viewing channel;

storing information indicative of the actual channel and start broadcast time of each of the viewer preferred programs;

scrutinizing the stored information to identify which of the preferred programs should appear on said personal viewing channel in accordance with their start broadcast time; and displaying, on said personal viewing channel, said identified preferred program.

16. The method according to claim 15 wherein the program listing is established manually by the viewer through entry of the start broadcast time and true channel of each preferred program.

17. The method of claim 15 wherein the program listing is established by compiling the start broadcast time and true channel of programs viewed by the viewer over a prescribed time interval.

18. The method according to claim 17 wherein the prescribed interval is one day.

19. The method according to claim 17 wherein the prescribed interval is one week.

20. The method according to claim 15 wherein the program listing is established by identifying viewer preferred programs based on keywords or topics of interest provided by the viewer.

21. The method of claim 16 wherein a different program listing is established for each of a plurality of personal channels.

22. The method of claim 17 wherein a different program listing is established for each of a plurality of personal channels.

23. The method of claim 20 wherein a different program listing is established for each of a plurality of personal channels.

24. The method according to claim 15 wherein the step of scrutinizing the stored information is performed periodically.

25. The method according to claim 15 wherein the displaying step includes the step of converting the true channel of the preferred program to the personal channel.

26. The method according to claim 15 wherein the step of scrutinizing the stored information includes the step of comparing the start broadcast time of each preferred program to present time.

27. The method according to claim 15 wherein the preferred programming is carried on at least one of: a cable television feed, a direct broadcast feed, a satellite feed, and an Internet link.

28. The method according to claim 15 further including the steps of:

scrutinizing the stored information to identify which preferred program should appear on a second picture-in-picture display in accordance with its start time; and displaying, on said second picture-in-picture display, said identified preferred program.

* * * * *